(12) United States Patent
Kweitko et al.

(10) Patent No.: US 6,383,077 B1
(45) Date of Patent: May 7, 2002

(54) AUTOMATED GAMING DEVICE AND SLOT MACHINE SERVICE COMMUNICATION SYSTEM

(76) Inventors: Ira A. Kweitko, 1302 Autumn Wind Way, Henderson, NV (US) 89052; Wayne A. Bossung, 9532 Summer Rain Dr., Las Vegas, NV (US) 89134

( * ) Notice: Subject to any disclaimer, the term of this patent is extended or adjusted under 35 U.S.C. 154(b) by 0 days.

(21) Appl. No.: 09/677,816

(22) Filed: Oct. 3, 2000

(51) Int. Cl.[7] ................................................. A63F 9/24
(52) U.S. Cl. ........................... 463/40; 463/16; 463/20; 273/121 B; 700/1
(58) Field of Search ........................ 463/20, 16, 29, 463/25, 40–41; 473/407; 455/412; 235/380; 273/121 B, 85, 202, 204, 143 R; 453/17; 700/1

(56) References Cited

U.S. PATENT DOCUMENTS

| | | |
|---|---|---|
| 4,099,722 A | 7/1978 | Johnson |
| 4,614,342 A | 9/1986 | Takasima |
| 5,424,940 A | 6/1995 | Ousborne |
| 5,611,730 A * | 3/1997 | Weiss ........................... 463/20 |
| 5,819,901 A | 10/1998 | Filiberti |
| 5,845,902 A | 12/1998 | Takemoto |
| 5,919,091 A | 7/1999 | Bell et al. |
| 5,944,162 A | 8/1999 | Filiberti |
| 5,954,576 A | 9/1999 | Coutler et al. |
| 5,954,583 A | 9/1999 | Green |
| 5,971,271 A * | 10/1999 | Wynn et al. ................. 235/380 |
| 5,999,808 A * | 12/1999 | Ladue ......................... 455/412 |
| 6,012,983 A | 1/2000 | Walker et al. |
| 6,039,648 A | 3/2000 | Guinn et al. |
| 6,062,991 A * | 5/2000 | Moriarty et al. ............ 473/407 |

* cited by examiner

*Primary Examiner*—Jessica J. Harrison
*Assistant Examiner*—Yveste G. Cherubin
(74) *Attorney, Agent, or Firm*—Quirk & Tratos (57) ABSTRACT

A computer assisted process useful in managing the task assignments of a pool of casino employees in accordance with the service requests issued by automated gaming machines either indicating the state of machine operation or the patron's request for attention issued at the machine is enabled with intra-casino communication devices. In accordance with the process the employee pool is fractioned by the type of service skill required, i.e., machine service or patron's requirement for attention, and each employee is assigned a uniquely addressed communication device to which the task assignment is communicated and by which the employee indicates task completion. The employee pool is decremented on each task assignment and incremented on each task completion in a first-in, first-out arrangement in each skill group. In the instances of a large casino facility further division into zones can be made with each zone having its own pool assigned.

16 Claims, 5 Drawing Sheets

AUTOMATED GAMING DEVICE AND SLOT MACHINE SERVICE COMMUNICATION SYSTEM

BACKGROUND OF THE INVENTION

1. Field of the Invention

The present invention relates to a service communication system for directing a service attendant to an automated, user operated device requiring service attention, and more particularly to a communications system for coordinating the assignments of a pool of service personnel.

2. Description of the Prior Art

In current casino settings the use of a large number of automated gaming devices, including slot machines, is an arrangement of substantial commercial preference. Automated devices allow for more varied selection of games, the comfort of impersonal interchange, along with all the other well-known advantages associated with automation, cybernetics and/or robotics. The automated gaming device and its most basic form, the slot machine, are therefore found in large numbers throughout commercial establishments devoted to gambling.

While the servile, untiring obedience of an automated device is well known, in a casino there still remains a substantial need for personal service. Most frequently the attention required in the course of use of a slot machine or automated gaming device is that associated with the demands of the patron. Typically the playing patron may not understand the mechanics of the use of the machine, may require some credit accommodation, or may simply be out of change. Less frequently, but nonetheless with some regularity, the automated device itself may require service, a function somewhat more technically complex entailing different skills and proficiency.

Both instances, however, evoke the same response from the patron, the response of pushing a summoning button to turn on a light on the machine. Since personal attention needs to be provided promptly to maintain customer satisfaction and loyalty, work duplication is inherent in this current practice. Moreover the number of illuminated summoning lights can become quite large on a busy day, to a point where perception is rendered difficult when displayed against a background of jackpot bells and other flashing lights, a background in which the attending staff encounters some difficulty in perceiving the requesting signal. Confusion is therefore inherent.

In the past various mechanisms have been devised which in one manner or another produce some kind of a remote signal indicating, or even anticipating, a troubling state of an automatic machine. For example: U.S. Pat. No. 5,954,576 to Coulter et al appears to teach a signaling system for a low coin level in a slot machine, allowing for a preemptive replenishment; U.S. Pat. No. 4,614,342 to Takashima appears to teach a multiple player automatic gaming system which is implemented with an indicator useful to indicate operational problems perceived by a player; and U.S. Pat. No. 5,919,091 to Bell et al appears to teach a plurality of casino gaming machines tied together in a computer network which includes servicing requests sent to a central station. Each of the foregoing, while suitable for the purposes intended, fails to attend to the noisy work setting of the attending personnel, and particularly the confusing mix of machine service and patron demand signals that is so prevalent in the current setting.

Those in the art will appreciate that a signal from a gaming casino patron sometimes coincides with one or another failure in the operation of the gaming machine. Simply, the latter precipitates the former. Thus patron attention requests that immediately follow or are contemporaneous with a machine failure are usually reporting the failure, and if both the service attendant and the patron assistant respond duplication is inherent. Accordingly, a logical process is required to detect these coinciding signals in order to direct only the service attendant to provide the response.

Moreover, some machine service requirements are less complex than others and can therefore be sequenced in the service assignment. Thus the service attendant may be assigned to replenish some coin hoppers on his path to the site of a major machine failure, again a logical sequencing process susceptible of programmed implementation. There are therefore numerous instances in a casino setting where coherent, logical communications will both simplify the process while also reducing the stress level of the employees.

Along with these requests summoning personal assistance or machine service are also the occasional signals indicating a jackpot payout that may exceed the coin storage capacity of the machine. These jackpots are usually accompanied by all sorts of light and sound displays which add to the already noisy background of a gambling establishment. Thus machine failure, an imminent need for intervention in the automatic operation thereof (e.g., running out of currency or coin) or any other condition that may be sensed by the diagnostic system of the machine are cumulative with the high stress events of a payout that is often competing with a patron's request for assistance now expressed by a single signal, a light on the machine requesting change.

In the past these concerns have been only sporadically considered, most often in the setting of a particular machine failure or servicing requirement. For example U.S. Pat. No. 5,919,091 to Bell et al appears to teach a communication system between a plurality of slot machines provided with some fault protection and a central control, while U.S. Pat. No. 5,954,583 to Green describes in portions thereof an automatic summoning process for calling a service operator. Once again, each of the foregoing, while suitable for the purposes intended, fails to describe or suggest a summoning system which logically selects the correct responding skill level, while conserving all others to their proper tasks.

Thus, mixed in with the requests summoning personal assistance, are also the occasional signals indicating a jackpot, a machine failure, an imminent need for intervention in the automatic operation thereof (e.g., running out of currency or coin) or any other condition that may be sensed by the diagnostic system of the machine. Clearly, this intense environment is prone to breed patron irritation.

A logical system that optimizes the response patterns and assignments of a large group of attending personnel is therefore extensively sought, and it is one such system that is disclosed herein.

SUMMARY OF THE INVENTION

Accordingly, it is the general purpose and object of the present invention to provide a central processing system for logical management of assisting and servicing personnel assignments.

Other objects of the present invention are to provide a wireless communication system for directing the assignments of servicing casino gaming machines and for assisting casino patrons.

Yet further objects of the invention are to provide a communication system for use in a casino for communicating various requests for personal assistance and sequencing machine servicing requests to a central processing facility for retransmission in a logical arrangement to individual ones of servicing and assisting personnel.

Briefly, these and other objects are accomplished within the present invention by providing a communication link between the various slot machines, automatic gaming machines and other automated devices in the casino that interface with a patron, and a central processing station. The communication link may be hard wired, by radio frequency (RF), infrared or even optical carrier and may convey separate codes for at least the following events at a gaming machine:

1. The patron has depressed the change button, causing a light to go on on top of the machine;
2. The player has caused the statistical combination of a jackpot and there is a large payment due;
3. The gaming machine is out of coins;
4. The machine is simply jammed; and
5. The machine is in some other failure state.

Of course, the first condition will often occur in parallel with items 2 through 5, as a patron will typically reach for the sole communication mechanism once any difficulty arises. Accordingly, within the central processing station the signals that carry diagnostic information are compared in their time relationship with the corresponding patron's personal service request signal, and if a coincidence is found a logical deduction is made that the former caused the latter. In this manner one primary source of confusion is reduced.

Moreover, the logical process does not need to differentiate between the machine service requests 2 through 5. In each instance the response required is one provided by a skilled machine service attendant and not by the personal patron assistant that heretofore was primarily devoted to providing change. In this manner the number of dispatching messages is reduced, optimizing the use of personnel.

Accordingly, upon receipt of the several signals 1 through 5 from a particular gaming machine the central station performs the above logical operation determining if the response is to be made by a service attendant, and if so a summoning signal is transmitted which identifies (a) the attendant selected, (b) the machine location from which the service signal was received, and (c) the type of service request, i.e., a code corresponding to one of the requests 2 through 5. If, on the other hand, the personal service (the light) signal is unrelated to a concurrent machine service request then the central station processor issues a personal service request, now directed to a particular patron assistant. Thus the central processing station selects the type of employee that is sent to cure the problem and the particular one of the employees within each class. This last selection is based on geometric proximity of the assigned employee pool, a pool continuously reduced by those summoned earlier that are still on assignment and increased by those that have completed their task, grouped by grid mapping of the casino wherein each grid coordinate is associated with a specific personnel roster. Once the assigned employee completes the task he or she then sends a completion signal to the central station and is returned back to the pool of available employees.

Concurrently the central station may also maintain a transaction log corresponding to each employee, each machine and each coordinate group. This transaction data may be used to develop assignment profiles, work load predictions and even redistribution of the whole employee roster in the various coordinate groups. This available data base is therefore not just useful in meeting customer demands but is also useful in casino management, to optimize staffing levels.

Accordingly, each casino service employee is provided with a communication device, e.g., a transceiver, by which the employee is summoned, directed to a particular machine and with which the employee then responds once the assignment is completed. These communication devices may take the form of general purpose pagers, or preferably a dedicated form useful with a single channel or narrow frequency, low wattage, local carrier or transmission medium. In each instance the information is transmitted in the form of data bursts or packets, including the identification code of the receiving device (destination address), the identification code of the sender (originating address) and the message (e.g., the coordinate of the machine to be serviced and the type of service).

Of course, the data packet may also include one or more error detection schemes to insure data integrity, (e.g., odd parity bit) which may automatically invoke a 'repeat' request back to the sender. The receiving instrument is thus assured of receiving the correct message which includes the location of the service request and the type of assignment (e.g., reload coin hopper). Similarly, the task completion response includes the identification code of the sender, the address of the recipient device and some code indicating completion of the assignment, together with error checking signals to invoke a similar 'repeat' response from the receiving device if a transmission error is detected.

Those in the art will appreciate that the foregoing transmission 'packets' are quite limited in their content or bit length and are therefore well suited for single channel transmission like that generally known under the mark or symbol "Ethernet" adopted by the Xerox Corporation, Stamford, Conn., and described in U.S. Pat. No. 4,063,220 to Metcalfe et al. More importantly, the several types of response to a summoning signal are particularly useful in rank ordering the interval between the various devices competing for the channel. Thus the central station will be accorded a higher priority, and therefore a shorter inactive interval following data collision, while the personal service transceivers are assigned the lowest priority and consequently the longest interval.

The foregoing single channel system is particularly suited for multiple network arrangement according to 'zones' in a single gaming establishment. Simply, the use of a single channel allows for very narrow carrier tuning, low power levels and therefore several communication systems may co-reside in a single facility without causing mutual interference or bandwidth crowding.

While the acknowledgment signal protocol and error checking substantially increase system reliability and convenience of use, further benefits may be derived from two-way communication. For example, a reassuring message like "an assistant is on the way" or "an assistant will be here shortly", depending on the current depth of previous assignments, may be communicated back to be displayed on the summoning device. The inventive communication system, therefore, both organizes the labor pool and also assists in the maintenance of patrons' tranquility and enjoyment.

DESCRIPTION OF THE PREFERRED EMBODIMENT

As shown in FIGS. 1 through 4, the inventive communication system generally designated by the numeral 10 comprises a first communication zone Z1 and a second communication zone Z2 where the signals between the zones may overlap. Zone Z1 comprises a central station generally at 11 including a transceiver stage 12 tied to a data processing system 14. Transceiver 12 then communicates by way of a narrow frequency band radio signal ff1 to a plurality of portable communication units 21-1 through 21-n, each of the units again including its own transceiver 22 tied to a logic stage 24.

Figure 1:
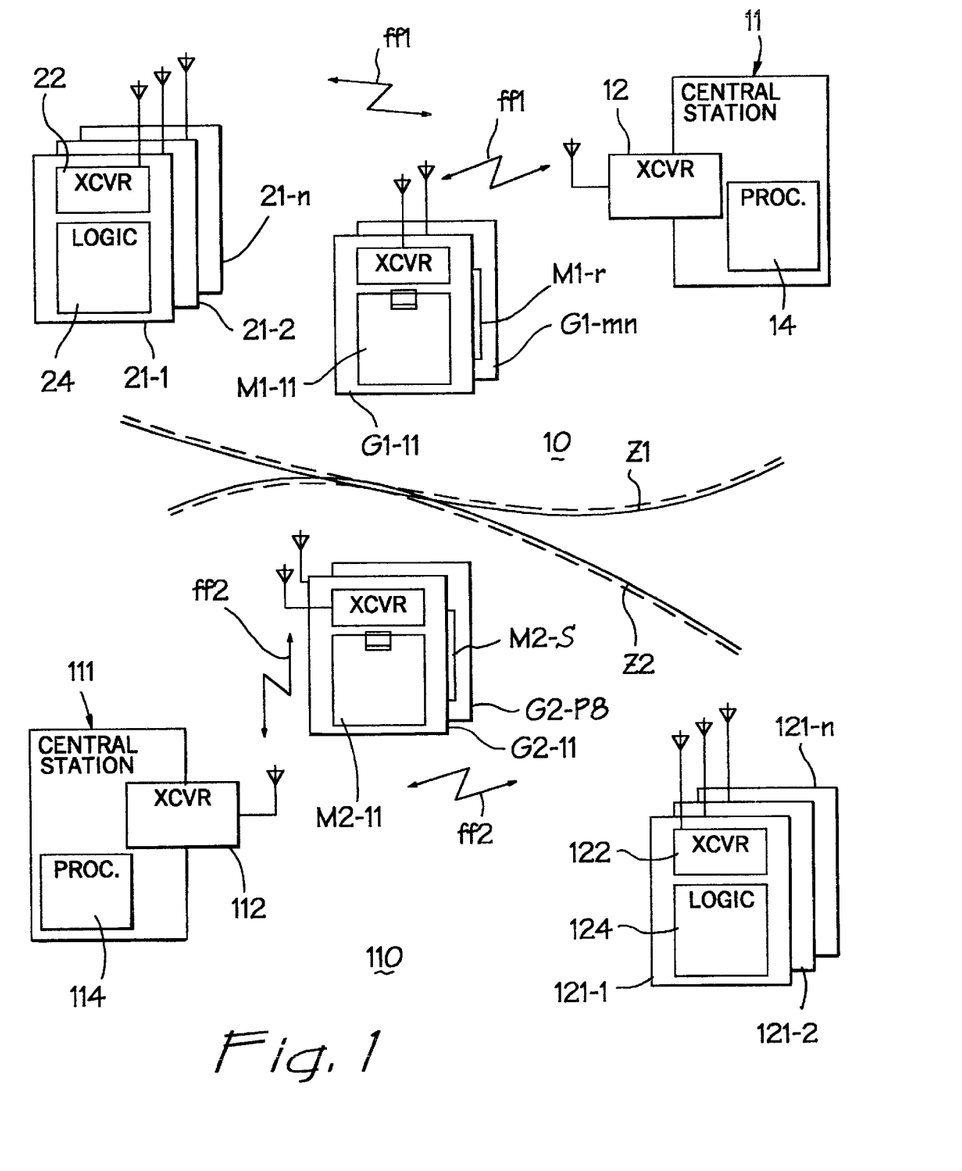
FIG. 1 is a diagrammatic illustration of an inventive casino communication system in accordance with a first implementation thereof.

Similarly, zone Z2 includes its own central station 111 also provided with a transceiver 112 and a processor 114 communicating by way of rf signal ff2 with a further plurality of communication units 121-1 through 121-n. Each of these-portable units, like those earlier described, includes a transceiver stage 122 tuned to the frequency ff2 and communicating with a logic stage 124.

Each of the zones Z1 and Z2 may be geometrically segmented into a set of grid coordinates G1-11 through G1-$mn$ and G2-11 through G2-$pq$ where the suffix defines the particular area within which one or more slot machines or other gaming devices are located, illustrated herein as machines M1-1 through M1-$r$ for those located in zone Z1 and as machines M2-1 through M2-$s$ for those in zone Z2. In a manner described below each of the foregoing machines M1-1 through M1-$r$ and M2-1 through M2-$s$ may be connected to the corresponding central station 11 and 111 either by way of the rf links ff1 and ff2 or even by hard wire (not shown). It is this communication path that transmits to the central station the earlier summarized conditions 1 through 5.

Figure 2:
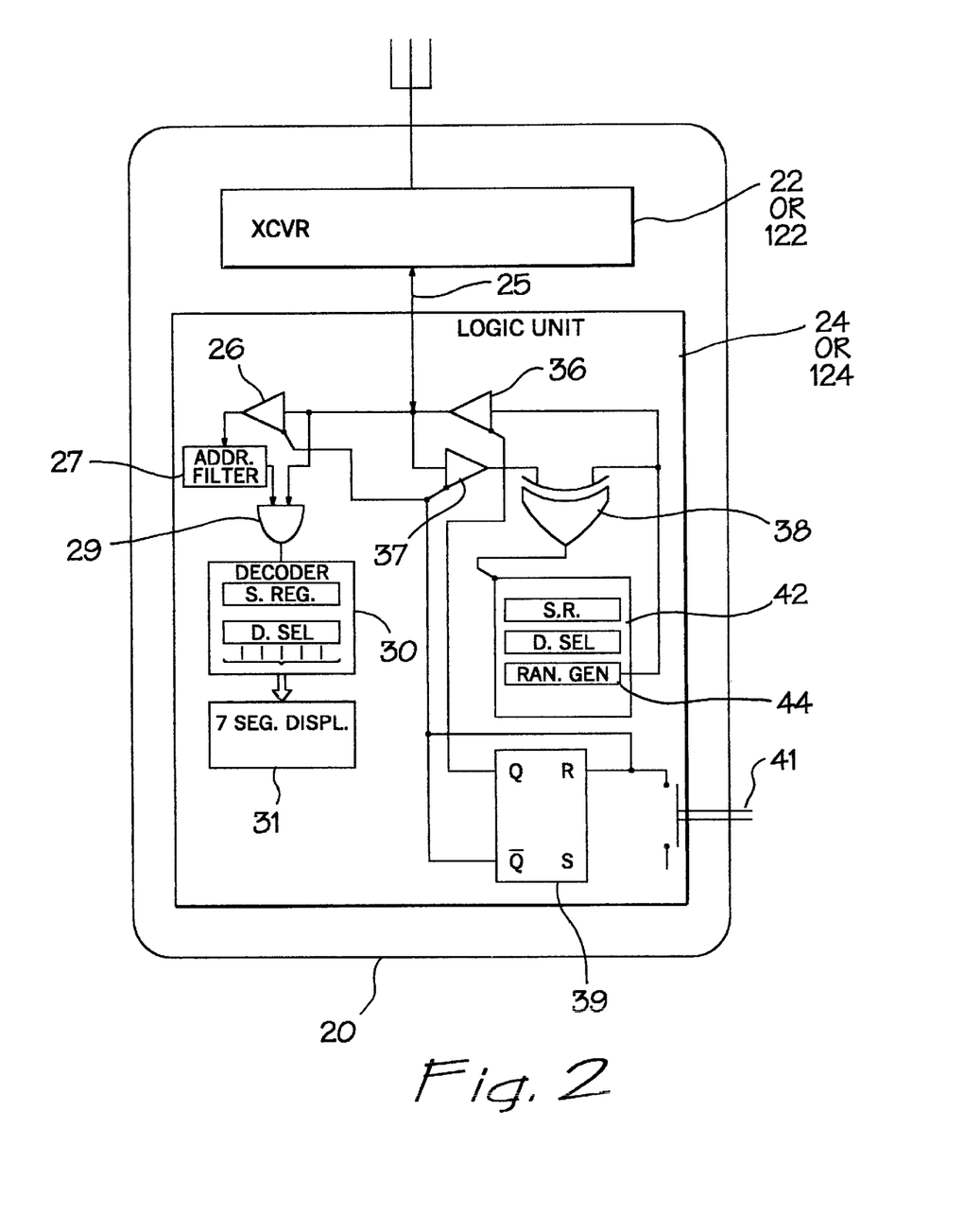
FIG. 2 is a logic diagram of a transceiver useful with the inventive communication system generally illustrated in FIG. 1.

By particular reference to FIG. 2 each of the communication units 21-1–21-$n$ and 121-1–121-$n$ take the form of a portable device contained in a housing 20 and including a message display. Except for the carrier frequency ff1 and ff2 the operation of transceivers 22 and 122 are functionally alike and their corresponding logic units 24 and 124 are also substantially alike excepting, of course, the unit's designation or address. Accordingly the description following refers by like numbered parts logical units that operate in like manner, it being understood that while one manner of implementation is disclosed the individual ones of the logical operations are well known and various levels of integration thereof are now commercially available.

Thus the transceiver 22 (and 122) may be any commercially available receiving-transmitting system tuned tightly to the frequency ff1 (or ff2) including means for phase, frequency or amplitude modulation and/or demodulation of a logical signal 25. Signal 25 is passed along one branch through a gate 26 to an address filter 27, which could be variously implemented and may take the form of a shift register read by a decoder (not shown), and when the code sequence corresponding to the designation of one of the communication units. If the address of the particular unit is decoded in the received bit stream of signal 25, address decoder 27 then enables an AND gate 29. The other input to gate 29 is then the same signal 25. Thus a signal path is opened following an address decode for transferring the succeeding bit burst to a message decoder 30 tied to a display 31, e.g., a 7-segment display. In this manner the central station can communicate to the portable unit the address of the machine requiring service, and perhaps the type of service 2–5, or personal attention.

Along the other branch of signal 25 a bidirectional gate configuration is provided comprising gates 36 and 37, respectively in the transmitting and receiving directions. The receiving gate 37 then passes its output to the input of an EXCLUSIVE OR gate 38. The selection between gate 26 and gates 36 and 37 is effected by a manual switch 41 on the unit exterior which sets a latch 39, the Q and Qnot ouputs of the latch then respectively enabling gates 26 and 36–37. Thus the employee assigned the portable unit issues the task completion signal by depressing switch 41 to reconfigured the unit to a data burst transmitter. This data packet, as previously described, may be generated in a data generator 42 and will include the destination address of the central station 11 or 111, the address of the sending unit and the code corresponding to a completed task. This same data stream is also fed to the other input of gate 38 for comparison, to detect any data collisions or interference, in a manner similar to that earlier described in the patents first disclosing the Ethernet implementation. If a collision is detected, gate 38 enables a clock driven random number generator 44 which delays the retransmission attempt.

Figure 3:
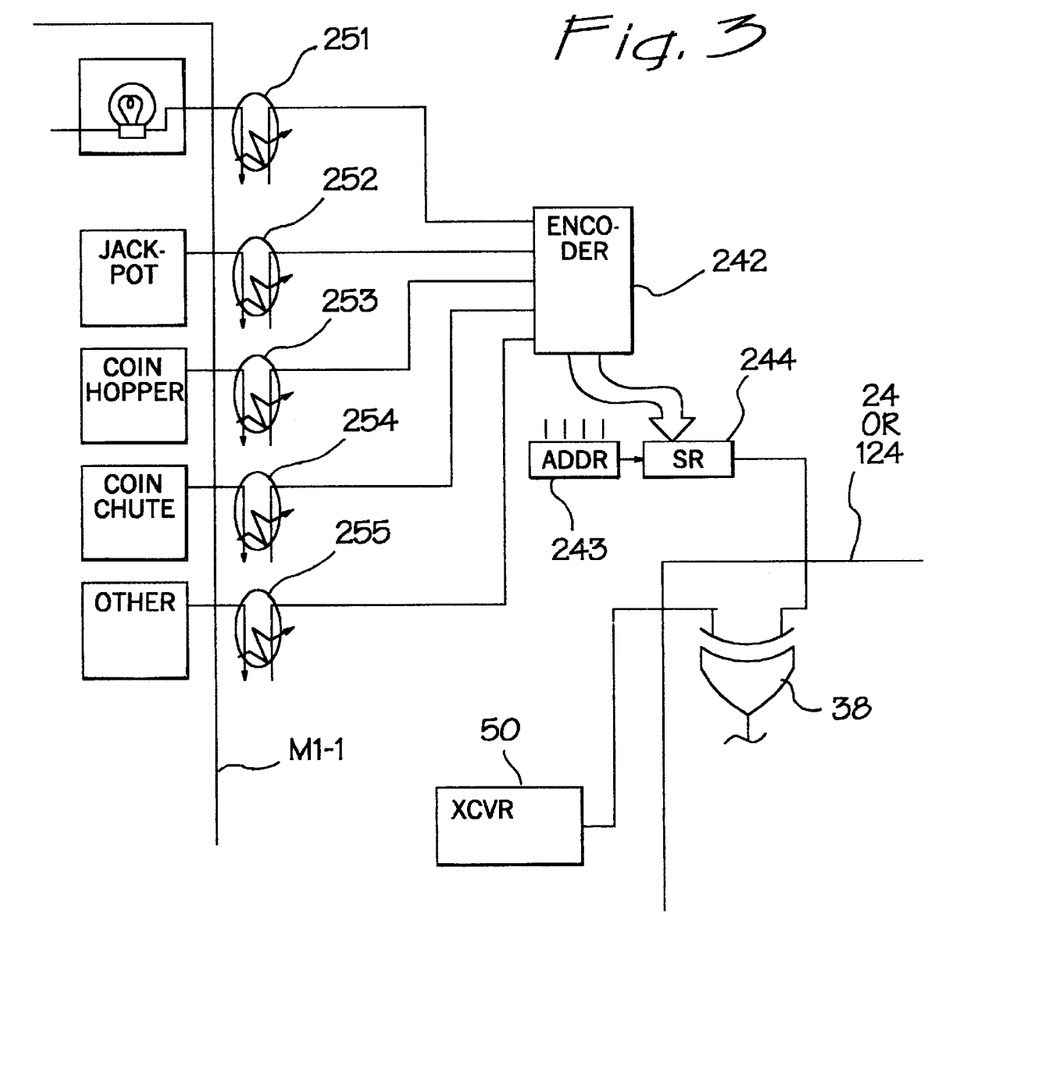
FIG. 3 is a logic diagram of a communication adaptor for slot machines or other gaming machines useful with the invention herein.

By particular reference to FIG. 3, each of the slot or gaming machines M1-1–M1-$r$ and M2-1–M2-$s$ is provided with a transceiver stage 50 tied to a logic unit 60 by way of a data signal. As before, transceiver 50 is tuned tightly to either of the carrier frequencies ff1 or ff2 which are separated from each other for optimal rejection of the other by well known techniques associated with tuned circuits. Again like numbered parts functioning in like manner the signal 25 from the transceiver is fed to the EXCLUSIVE OR gate 38 which compares the signal against the output of an encoding stage 242 which collects the outputs of a plurality of photo couplers 251 through 255 corresponding to the earlier described conditions 1 through 5. Within encoder 242 this signal combination is combined with the output of a register 243 in which the destination address (corresponding central station) and the sending address (the numerical designation of the machine) are then side loaded to a shift register 244 for transmission. The output of register 244 is then tied to signal 25 and also to the input of gate 38 to detect data collisions. These are then resolved in a manner earlier described by reference to the clock driven random number generator 44.

Since each machine is essentially a passive device for the purposes of the instant invention no local need exists for any display or task assignment. Accordingly those functions earlier ascribed to logic operations at gate 29, encoder 30 and display 31 are not required, nor is there a requirement for any latching function.

Figure 4:
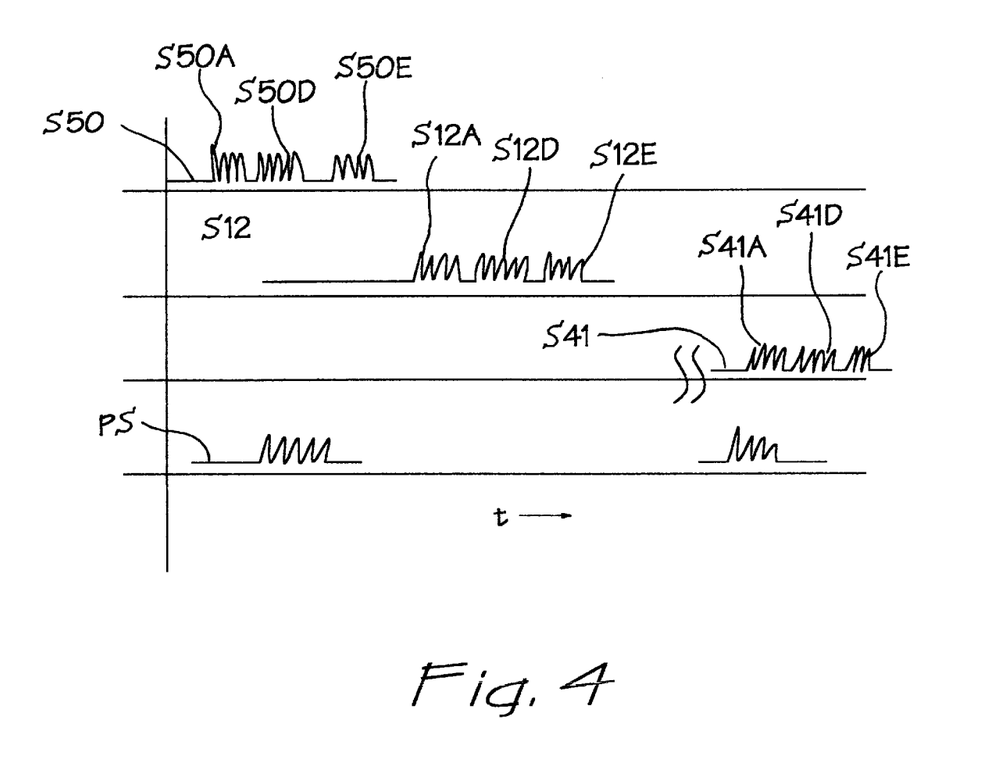
FIG. 4 is a pulse diagram of a pulse sequence useful in the transmission of signals in the inventive communication system shown in FIG. 1.

By reference to FIG. 4, the first signal in any requesting process is that emitted by transceiver 50, shown as signal S50 and comprising a bit sequence for the destination and sending address S50A, followed by the fault code 1–5, shown as sequence S50D and thereafter the error checking bits S50E. As this signal sequence is in the carrier ff1 (or ff2) all other transceivers defer in response to the suppression signal from the corresponding gates 38. On completion the carrier is once again idle and each of the gates 38 will then allow its own transmission. As will be shown below, the typical sequence will be from the central station transceiver 12 (or 112), shown as signal S12, again comprising the address sequence S12A, the data sequence S12D and error sequence S12E. It is this signal that selects a particular portable unit and delivers a data message thereto. Once the task assigned is completed the employee depresses the task completion switch 41 to issue its response signal stream S41 comprising sequences S41A, S41D and S41E. In each instance the channel is monitored for the presence of other data in the manner earlier described.

Figure 5:
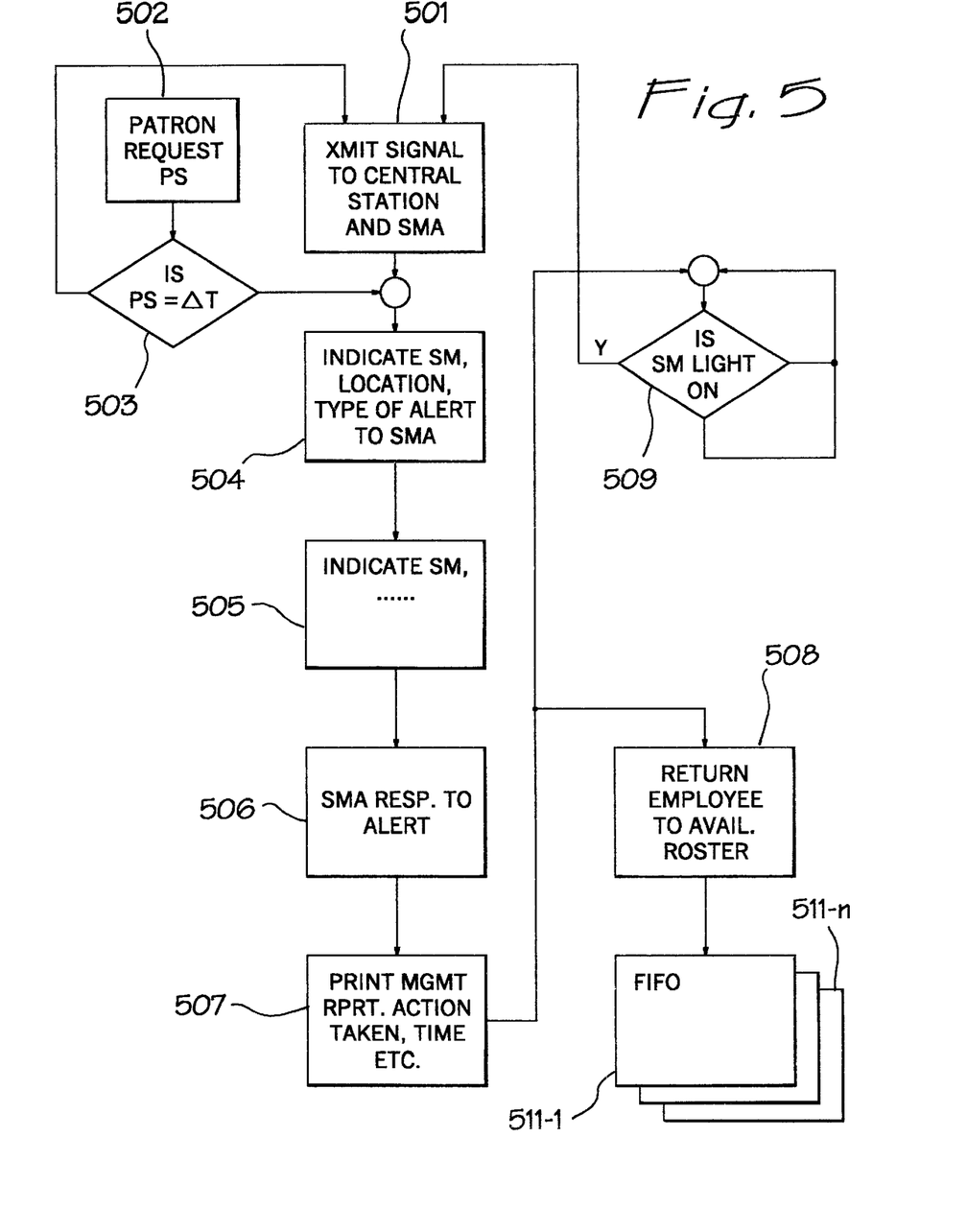
FIG. 5 is a flow chart illustrating the sequence of steps effected by the logical processes of the present invention.

This same signal sequence is logically developed in the course of operation of the data processing system 14 (or 114), in a logical sequence illustrated in FIG. 5. In this sequence the slot machine or device M1-1 (or any other machine) issues the service requesting signal S50 received in step 501 indicating the source of the request and the type of problem. Concurrent therewith the patron may also be making a request shown as a signal sequence PS, received in step 502. The timing between the signals is then compared in step 503 and if signal PS lags signal S50 by a selected time increment or less then the sequence is returned to the main branch at step 504. Otherwise, signal PS returns to the initial step 501 as a separate, unrelated process.

In step 504 the request is identified and a service assignment is then communicated in step 505, as signal S12, to the employee at the bottom of a first-in, first-out stack (FIFO) 511-1–511-n, assigned to each grid coordinate. On the completion of the task the employee sends the completion signal S41 reconciled in step 506. Then in step 507 a record is made of the service, including the length thereof, and in step 508 the employee is returned back to those available in FIFO stack 511-1–511-n. Thereafter the system remains in an idle do-loop shown at step 509, waiting for the next request signal.

In this manner a single, very narrow bandwidth communication carrier can be used to service contiguous zones which because of its narrow nature is relatively immune to cross-talk or other interference. The same attributes render this system particularly useful for low power, multiple area application.

While the foregoing description illustrates the various data reception and transmission paths by way of holding registers, shift registers and the like, such is illustrative only. Those in the art will appreciate that various serial data transmission and reception devices, at various levels of integration and capacity, are currently available, as for example devices commonly known as Universal Asynchronous Receiver and Transmitters [UARTs].

In all the forms illustrated herein the inventive system allows for higher employee productivity, better management information and, most importantly, better customer response. Moreover, good data is available for analysis on the reliability of the various machine types, assisting in the task of quality control.

Since the foregoing system communicates into a single channel, the same task assignment signal directing the employee to a particular casino machine location may also be utilized to display a re-assuring message like "Your request will be serviced in just a few minutes." In this manner optimal employee use is effected while also maintaining good customer relations.

Obviously, many modifications and variations can be effected without departing from the spirit of the invention disclosed herein. It is therefore intended that the scope of the invention be determined solely by the claims appended hereto.

We claim:

1. A computer assisted communication and personnel management system useful in directing task assignments to a pool of gaming casino employees, including employees of a first and a second skill, in response to request signals initiated by casino patrons or service signals automatically caused by one or more conditions in a casino gaming machine, comprising:

a plurality of first transceivers each operatively connected to a corresponding one of said gaming machines and each conformed to issue said request signal in response to a manual input from a casino patron and to issue said service signal indicative of a preselected condition of said corresponding gaming machine;

a plurality of second transceivers each associated with a corresponding one of said casino employees and each conformed to receive a specifically coded one of task assignment signals and to transmit a corresponding task completion signal upon a manipulation by said employee associated therewith;

a central processor conformed to receive said request and service signals and said task completion signals to emit said task assignment signals according to a corresponding logical combination thereof;

data storage means operatively connected to said central processor and conformed to store said task assignment and task completion signals in association with each said casino employee;

said central processor further including logical processing means operatively connected to receive said request and service signals for producing a first logical combination if said receipt of said request signal precedes said service signal, a second logical combination if said receipt of said service signal precedes by less than a preselected time interval said request signal and a third logical combination if said receipt of said service signal precedes said request signal by a time interval equal or greater than said preselected time interval; and signaling means operatively connected to receive said first, second and third logical combinations for directing said task assignment signal to a selected one of said second transceivers associated with an employee of said first skill upon the occurrence of said second and third logical combinations and for directing said task assignment signal to a selected other one of said second transceivers associated with an employee of a second skill upon the occurrence of said first logical combination.

2. A system according to claim 1, wherein:

each said task assignment signals includes location data corresponding to the location of a gaming machine to which said task is assigned; and each said second transceiver includes a visual display conformed to display a message indicative of the location of a casino gaming machine corresponding to said location data.

3. A system according to claim 2, wherein:

said request signals, service signals, task assignment signals and task completion signals are radio frequency signals; and said first and second transceivers are each radio frequency communication devices.

4. A system according to claim 3, wherein:

said request signals, service signals, task assignment signals and task completion signals are all electromagnetic signals of a common radio frequency; and said first and second transceivers include means for signal monitoring of all request, service, task assignment and task completion signals.

5. A system according to claim 1, wherein:

said central processor includes logical processing conformed to receive said task assignment and task completion signals for reducing said employee pool on each occurrence of said task assignment signal and for increasing said pool upon each occurrence of said task completion signal.

6. A system according to claim 5, wherein:

said reducing and increasing of said employee pool is arranged in a first-in first-out sequence.

7. A system according to claim 6, wherein:

said request signals, service signals, task assignment signals and task completion signals are radio frequency signals; and said first and second transceivers are each radio frequency communication devices.

8. A system according to claim 7, wherein:

said request signals, service signals, task assignment signals and task completion signals are all electromagnetic signals of a common radio frequency; and said first and second transceivers include means for signal monitoring of all request, service, task assignment and task completion signals.

9. A computer assisted communication and personnel management system useful in directing task assignments to a pool of gaming casino employees, including employees of a first and a second skill, in response to request signals initiated by casino patrons or service signals automatically caused by one or more conditions in a casino gaming machine, comprising:

a plurality of first transceivers each operatively connected to a corresponding one of said gaming machines and each conformed to issue said request signal in response to a manual input from a casino patron and to issue said service signal indicative of a preselected condition of said corresponding gaming machine;

a plurality of second transceivers each associated with a corresponding one of said casino employees and each conformed to receive a specifically coded one of task assignment signals and to transmit a corresponding task completion signal upon a manipulation by said employee associated therewith;

a central processor conformed to receive said request and service signals and said task completion signals to emit said task assignment signals according to a corresponding logical combination thereof;

data storage means operatively connected to said central processor and conformed to store said task assignment and task completion signals in association with each said casino employee;

said central processor including logical processing means operatively connected to receive said request and service signals for producing a first logical combination if said receipt of said request signal precedes said service signal, and a second logical combination if said receipt of said service signal precedes said request signal; and signaling means operatively connected to receive said first, and second logical combinations for directing said task assignment signal to a selected one of said second transceivers associated with an employee of said first skill upon the occurrence of said second and third logical combination and for directing said task assignment signal to a selected other one of said second transceivers associated with an employee of a second skill upon the occurrence of said first logical combination.

10. A system according to claim 9, wherein:

each said task assignment signals includes location data corresponding to the location of a gaming machine to which said task is assigned; and each said second transceiver includes a visual display conformed to display a message indicative of the location of a casino gaming machine corresponding to said location data.

11. A system according to claim 10, wherein:

said request signals, service signals, task assignment signals and task completion signals are radio frequency signals; and said first and second transceivers are each radio frequency communication devices.

12. A system according to claim 11, wherein:

said request signals, service signals, task assignment signals and task completion signals are all electromagnetic signals of a common radio frequency; and said first and second transceivers include means for signal monitoring of all request, service, task assignment and task completion signals.

13. A system according to claim 12, wherein:

said central processor includes logical processing conformed to receive said task assignment and task completion signals for reducing said employee pool on each occurrence of said task assignment signal and for increasing said pool upon each occurrence of said task completion signal.

14. A system according to claim 13, wherein:

said reducing and increasing of said employee pool is arranged according to a first-in first-out sequence, wherein each said task completion signal corresponds to an increase of the pool and said task assignment signal corresponds to a decrease of said pool.

15. A method for managing the task assignments of casino employees including at least a first skill group and a second skill group comprising the steps of:

receiving signals from the casino gaming machines indicative of a casino patron's request for attention and machine service requirement signals;

issuing a task assignment signal to one of the casino employees in the first skill group if the received signal is indicative of a patron's request for attention and to one of the casino employees in the second skill group if the signal is a machine service signal;

decrementing the remaining pool of employees in the first and second skill groups in accordance with the task assignment signal;

issuing a task completion signal corresponding to each said task assignment signal upon the completion of the task assigned;

and incrementing the remaining pool of employees in the first and second skill groups in accordance with the task completion signal.

16. A method according to claim 15, further comprising the steps of:

comparing the time lag between said machine service signal and a patron's request signal issued at the same machine against a preselected interval and if said time interval is less than said preselected interval suppressing said patron's request signal.

* * * * *